340-870.13 SR SUBSTITUTE FOR MISSING OR

OR 4,040,059

T 340-183

X 370-112

[redacted]
United States
Simons et al.

4,040,059
Aug. 2, 1977

[54] MISSILE BODY TELEMETRY SYSTEM

[75] Inventors: Robert W. Simons, Santa Clara; Martin G. Troop, Sunnyvale, both of Calif.

[73] Assignee: The United States of America as represented by the Secretary of the Navy, Washington, D.C.

[21] Appl. No.: 718,488

[22] Filed: Aug. 30, 1976

[51] Int. Cl.[2] .................... H04J 3/00

[52] U.S. Cl. .................... 343/203; 325/113; 340/183

[58] Field of Search .................... 325/113; 343/203; 178/30; 340/183

[56] References Cited

U.S. PATENT DOCUMENTS

| | | | |
|---|---|---|---|
| 2,866,970 | 12/1958 | Hughes | 343/203 |
| 3,793,636 | 2/1974 | Clark | 340/183 |
| 3,936,807 | 2/1976 | Edwards | 340/183 |

*Primary Examiner*—Thomas B. Habecker
*Attorney, Agent, or Firm*—R. S. Sciascia; Charles D. B. Curry; Francis I. Gray

[57] ABSTRACT

A telemetry system for a tactical missile having a central multiplexer which receives in parallel high frequency digital data and analog data, and outputs a serial PCM NRZ-L bit stream with the data word-interlaced. The central multiplexer also provides timing for elements of the telemetry system to maintain system synchronization.

9 Claims, 2 Drawing Figures

T 340-183

MISSILE BODY TELEMETRY SYSTEM

BACKGROUND OF THE INVENTION

1. Field of the Invention

The present invention relates to transmission systems, and more particularly to a telemetry system for a tactical missile.

2. Description of the Prior Art

The function of a telemetry system is to measure and sense missile parameters, condition the signal in some cases, and encode, modulate and transmit the data to receiving equipment. A prior missile telemetry system bit-interlaced high frequency digital data and analog data which required specialized data reduction hardware (decommutators) at the receiving station.

SUMMARY OF THE INVENTION

Accordingly, the present invention provides a telemetry system which receives high frequency digital data in parallel with analog data and outputs a PCM (Pulse Code Modulated) NRZ-L (Non Return to Zero-Level) bit stream in which the high frequency digital data and analog data are word-interlaced. A central multiplexer receives high frequency digital data and stores it in a digital register. An analog multiplexer in the central multiplexer receives PAM (Pulse Amplitude Modulated) data from remote submultiplexers, as well as analog data, which is converted to digital data. The high frequency digital data from the digital register is interlaced with the digitized analog data in a formatter in the form of 8-bit words. The output of the central multiplexer is the serial PCM bit stream which is premodulated for transmission and also delayed by a solid state delay device before transmission.

DESCRIPTION OF THE PREFERRED EMBODIMENT

Figure 1:
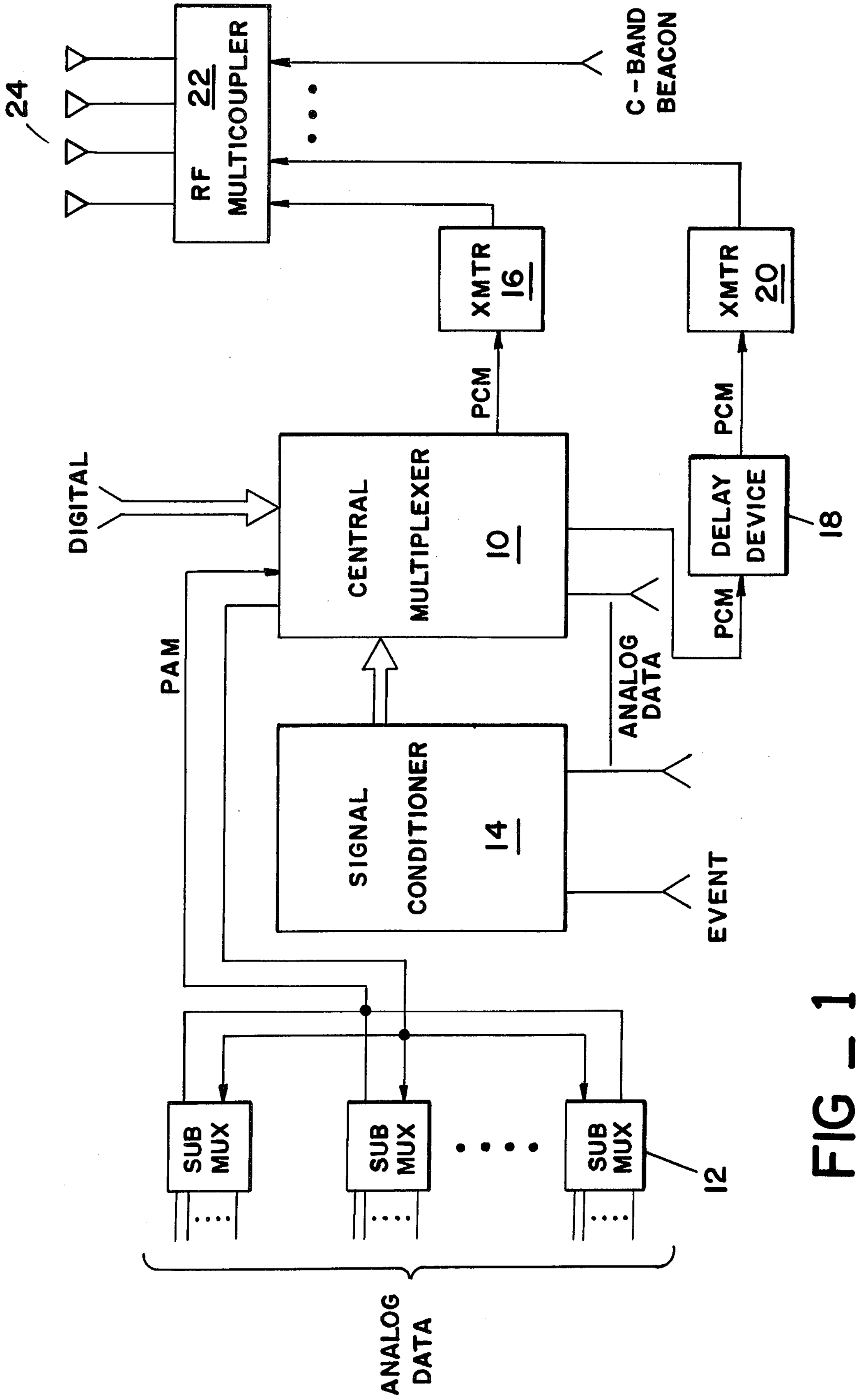
FIG. 1 is a block diagram of a missile telemetry system.

Referring now to FIG. 1, a central multiplexer 10 is a programmable encoder which accepts both analog and digital inputs and outputs a serial Pulse Code Modulated (PCM) Non Return to Zero-Level (NRZ-L) bit stream composed of 8-bit digital words. Selected data such as pressure, temperature, voltage, current, etc. is input to a plurality of remote submultiplexers 12 located throughout the missile. The submultiplexers 12 accept analog inputs and are used to increase the amount of usable data for a given bandwidth. The output of the submultiplexers 12 is in the form of serial Pulse Amplitude Modulated (PAM) data which is input to the central multiplexer 10.

A signal conditioner 14 conditions analog data to 0 to 5 volt dc analog; conditions incoming digital data, such as single-bit event data, to discrete levels; and provides proper impedance matching to interface with the central multiplexer 10.

The PCM NRZ-L data from the central multiplexer 10 is input to a uhf transmitter 16 and to a solid state delay device 18. The solid state delay device 18 converts the serial bit stream to a parallel bit stream and delays the parallel bit stream in a series of parallel shift registers for a period of time, typically 1 or 2 seconds, depending upon the number of shift register stages. The output of the shift registers is converted to a serial PCM NRZ-L bit stream which is filtered and input to a second transmitter 20. The delay allows for data recovery during rf blackout periods such as underwater travel and staging events. The parallel delaying reduces power requirements by two thirds, and a malfunctioning parallel channel will not effect all the data.

The transmitters 16, 20 are frequency modulated by the PCM bit stream, and operate in the frequency range of 2.2 to 2.3 gigahertz (GHz) by direct generation of the frequency without multiplication of a lower frequency, as was done previously. The output of the transmitters 16, 20 is fed to an rf multicoupler 22. The direct generation of the transmitter 16, 20 frequency improves stability and efficiency, and dc coupling eliminates baseline galloping. Also input to the rf multicoupler 22 is a C-band beacon signal. The rf multicoupler 22 has diplexers and hybrids that multiplex up to four telemetry (S-band) inputs with one transponder (C-band) input.

One or more antennas 24 are fed by the rf multicoupler 22 for transmission to a receiving station. For missile applications four antennas 24 are desired to provide complete coverage for the transmission. The antennas 24 are linearly polarized cavity backed units using a common cavity for telemetry and beacon frequencies.

Figure 2:
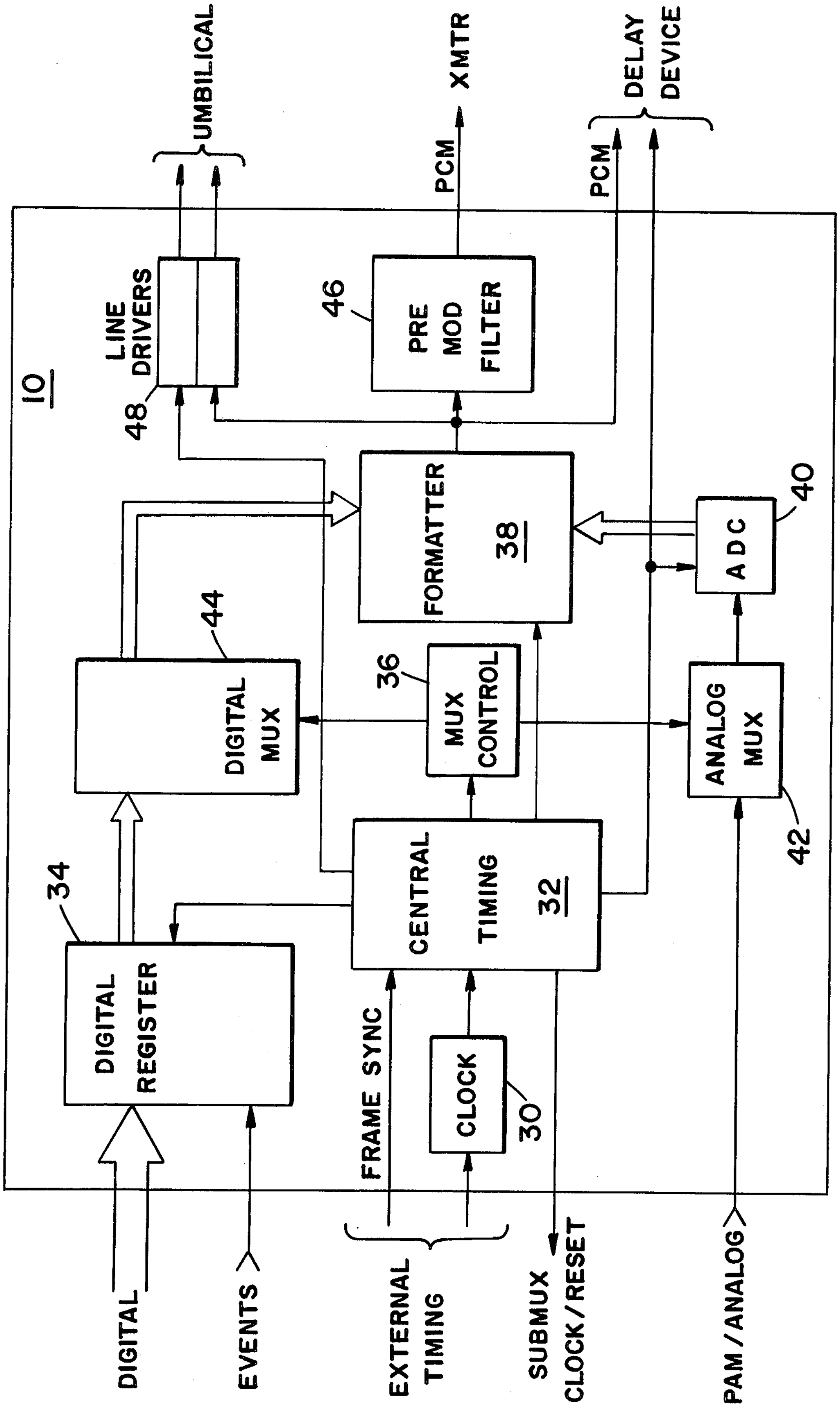
FIG. 2 is a clock diagram of a central multiplexer for the missile telemetry system.

The central multiplexer 10, shown in FIG. 2, is the data sequencing unit for the telemetry system. It interfaces with high frequency digital data, analog data and PAM data, as well as with conditioned event and analog data from the signal conditioner 14, multiplexes these inputs, and outputs the PCM NRZ-L bit stream to the transmitter 16 or delay device 18. As an example, the central multiplexer 10 may have a frame length of 192 8-bit words and a frame rate of 400 frames per second for a total bit rate of 614.4 K-bits per second. An analog prime frame would have a sufficient number of frames, such as 64, to provide time for all analog data to cycle through the telemetry system one time.

A system clock 30 operates in conjunction with an external clock in the missile to maintain synchronization between other missile data systems and the telemetry system. In the absence of the external synchronization, the clock 30 operates independently. The clock 30 provides the timing pulses for the central timing unit 32 which provides timing to a digital register 34, a multiplexer control 36, a formatter 38 and an analog-to-digital converter (ADC) 40. A frame strobe associated with the high frequency digital data provides synchronization to the central timing 32 to sync the formatter 38 with the incoming data. An analog multiplexer 42 and a digital multiplexer 44 are controlled by the multiplexer control 36. The multiplexer control 36 blanks a number of the analog multiplexer 42 channels for insertion of digital data from the digital register 34 and the digital multiplexer 44. The central timing unit 32, multiplexer control 36 and formatter 38 act in conjunction to tell each multiplexer 42, 44 and the digital register 34 when to output.

The digital register 34 stores and inserts high frequency digital data from various missile data systems, such as 81.6 KHz data from guidance, flight control and interlocks, into the formatter 38 via the digital multiplexer 44. Bi-level event digital data is also inserted into the digital register 34, and thence into the formatter 38 via the digital multiplexer 44. The remaining channels of the analog multiplexer 42 process the PAM and analog data which is converted by the analog-to-digital converter (ADC) 40 into 8-bit digital words, and then inserted into the formatter 38. The output of the formatter 38 is the serial NRZ-L PCM bit stream which is filtered by a pre-modulation filter 46 to round the waveform edges before being fed to the transmitter 16, and is fed unfiltered to the delay device 18 and a line driver 48.

The line driver 48 is a dual driver used to drive a long line through the missile umbilical for pre-flight testing. Both the PCM NRZ-L data and timing from the central timing unit 32 are supplied to the umbilical by the line driver 48.

The high frequency digital data in the form of either 51-bit words, the last three bits of which are not used, or 16-bit words are stored in the digital register 34 and are strobed out in 8-bit word increments to the digital multiplexer 44 from which each word increment is inserted into the space in the formatter 38 created by blanking one analog multiplexer 42 channel. The digital register 34 has two shift registers for each high frequency digital input. For 51-bits per word data the shift registers are 192 bits long, and for the 16-bits per word data the shift registers are 64 bits long. When one of the two registers per input is full, it unloads the 8-bit words while the second register is being loaded. Thus, one register unloads while the other loads to maintain a continuous flow of data without waiting. The digital register 34 also has a shift register for the bi-level event data which shifts out the data as 8-bit words to the digital multiplexer 44.

The central multiplexer 10 also provides timing to the remote submultiplexers 12 and the delay device 18. The clock pulses from the central multiplexer 10 alternately open and close a sequence of solid state switches, one for each submultiplexer channel, and during the switch opening a fixed-duration sample of the analog data being sampled is passed. Each submultiplexer channel is interrogated sequentially, and then all submultiplexers 12 are reset to channel 1 by a reset pulse from the central multiplexer 10, renewing the interrogation process.

The telemetry system is powered by a separate battery to avoid interference with other missile electrical systems for increased missile reliability.

Thus, the present telemetry system provides a NRZ-L PCM bit stream with high frequency digital data word-interlaced with missile telemetry data.

What is claimed is:

1. A missile telemetry system comprising:

a. means for converting analog data into a serial pulse amplitude modulated (PAM) data stream;

b. a central multiplexer to convert said PAM data, analog data, bi-level data and high frequency digital data into a pulse code modulated (PCM) non return to zero-level (NRZ-L) bit stream in the form of digital words, said high frequency digital and bi-level data being word-interlaced with said PAM and analog data, said central multiplexer also providing timing for elements of said telemetry system;

c. a solid state delay device to provide a delayed PCM bit stream from said PCM bit stream; and d. means for transmitting both said PCM bit stream from said central multiplexer and said delayed PCM bit stream from said solid state delay device to a receiving station.

2. A missile telemetry system as recited in claim 1 further comprising a signal conditioner to condition analog and said bi-level data to appropriate voltage levels for input to said central multiplexer, and to provide impedance matching with said central multiplexer.

3. A missile telemetry system as recited in claim 2 wherein said central multiplexer comprises:

a. a clock operating in conjunction with an external timing source;

b. a central timing unit operating from said clock to provide synchronization to elements of said telemetry system and of said central multiplexer;

c. a digital register to store said high frequency digital data and said bi-level data;

d. a digital multiplexer to convert the output of said digital register into digital words;

e. an analog multiplexer and analog-to-digital converter in series to convert said PAM and analog data into digital words;

f. a formatter to interlace said high frequency digital words and bi-level words with said PAM and high frequency analog words to produce said PCM bit stream; and g. a multiplexer control to blank said analog multiplexer when said high frequency digital and bi-level words are being interlaced in said formatter.

4. A missile telemetry system as recited in claim 3 wherein said central multiplexer further comprises a pre-modulated filter to round the waveform edges of said undelayed PCM bit stream prior to transmission.

5. A missile telemetry system as recited in claim 4 wherein said converting means comprises a plurality of remote submultiplexers.

6. A missile telemetry system as recited in claim 5 wherein said transmitting means comprises:

a. an undelayed uhf transmitter which is frequency modulated by said undelayed PCM bit stream;

b. a delayed uhf transmitter which is frequency modulated by said delayed PCM bit stream;

c. an RF multicoupler to combine the outputs of said transmitters with a C-band beacon; and d. an antenna to radiate the output of said RF multicoupler to a receiving station.

7. A missile telemetry system as recited in claim 6 wherein said delay device further comprises:

a. means for delaying said PCM bit stream in a parallel digital manner;

b. means for outputting said delayed PCM bit stream in a serial digital manner; and c. a filter to round the waveform edges of said delayed PCM bit stream prior to transmission.

8. A missile telemetry system as recited in claim 7 wherein said antenna comprises a linearly polarized, cavity backed, dual-frequency unit having a common cavity for the transmitter and C-band beacon frequencies.

9. A missile telemetry system as recited in claim 8 wherein said central multiplexer further comprises a dual line driver to drive a longline to a missile umbilical through which is fed synchronization from said central timing unit and said PCM NRZ-L bit stream from said formatter for ground testing of said telemetry system.

* * * * *